United States Patent
Medisetti et al.

(10) Patent No.: US 11,734,238 B2
(45) Date of Patent: Aug. 22, 2023

(54) CORRECTING DATA ERRORS FOR DATA PROCESSING FAULT RECOVERY

(71) Applicant: Bank of America Corporation, Charlotte, NC (US)

(72) Inventors: Venkata Durga Rao Medisetti, Hyderabad (IN); Naresh Soni, Mumbai (IN); Siju Abraham, Mumbai (IN); Barnali Sanyal, Kolkata (IN); Vinay Jaisinghani, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/314,483

(22) Filed: May 7, 2021

(65) Prior Publication Data

US 2022/0358101 A1  Nov. 10, 2022

(51) Int. Cl.
*G06F 16/215* (2019.01)
*G06F 16/25* (2019.01)
(Continued)

(52) U.S. Cl.
CPC ........ *G06F 16/215* (2019.01); *G06F 16/1794* (2019.01); *G06F 16/212* (2019.01);
(Continued)

(58) Field of Classification Search
CPC ...... G06F 16/215; G06F 16/27; G06F 16/212; G06F 16/258; G06F 16/254;
(Continued)

(56) References Cited

U.S. PATENT DOCUMENTS 7,251,578 B1   7/2007  Chen et al.
7,912,842 B1*  3/2011  Bayliss ............... G06F 16/215
                                                  707/749

(Continued)

FOREIGN PATENT DOCUMENTS

CN   102629223 B    4/2015
EP     2862101 B1  10/2018
(Continued)

OTHER PUBLICATIONS

Medisetti, V. D. R. et al., "Recovering From Data Processing Errors by Data Error Detection and Correction," U.S. Appl. No. 17/314,364, filed May 7, 2021, 42 pages.

*Primary Examiner* — Alford W Kindred
*Assistant Examiner* — Lin Lin M Htay

(57) ABSTRACT

A system is provided for resolving data errors. The system is configured to obtain an erroneous data element received from a source system and generate a plurality of probable data values for the data element. For each probable data value of the plurality of probable data values, the system verifies whether the probable data value can be processed successfully by an Extract, Transform and Load (ETL) logic and by one or more target applications configured to process the data element. The system determines one of the probable data values as a suggested data value of the data element, based on the verification of the probable data values. The system outputs the suggested data value for processing by the ETL logic.

15 Claims, 4 Drawing Sheets

(51) Int. Cl.
  *G06F 16/27* (2019.01)
  *G06F 16/21* (2019.01)
  *G06F 16/178* (2019.01)

(52) U.S. Cl.
  CPC .......... *G06F 16/254* (2019.01); *G06F 16/258* (2019.01); *G06F 16/27* (2019.01); *G06F 16/273* (2019.01); *G06F 16/275* (2019.01); *G06F 16/278* (2019.01)

(58) Field of Classification Search
  CPC .... G06F 16/273; G06F 16/275; G06F 16/278; G06F 16/1794
  See application file for complete search history.

(56) References Cited

U.S. PATENT DOCUMENTS

| | | | |
|---|---|---|---|
| 8,577,833 B2 | 11/2013 | Erla et al. | |
| 8,666,919 B2 | 3/2014 | Miranda et al. | |
| 8,688,625 B1 | 4/2014 | Clark et al. | |
| 8,719,769 B2 | 5/2014 | Castellanos et al. | |
| 8,751,438 B2 | 6/2014 | Kharod et al. | |
| 9,075,860 B2 | 7/2015 | Kozina et al. | |
| 9,367,574 B2 | 6/2016 | Gupta | |
| 9,449,060 B2 | 9/2016 | Dhayapule et al. | |
| 9,552,401 B2 | 1/2017 | Bender | |
| 9,576,036 B2 | 2/2017 | Li et al. | |
| 9,607,060 B2 | 3/2017 | Li et al. | |
| 9,697,066 B2 | 7/2017 | Grasselt et al. | |
| 9,740,757 B1 | 8/2017 | Glider et al. | |
| 9,811,574 B2 | 11/2017 | Verger-Del Bove et al. | |
| 9,922,072 B1 | 3/2018 | Clark et al. | |
| 9,928,283 B2 | 3/2018 | Catalano, Sr. et al. | |
| 10,067,993 B2 | 9/2018 | Dhayapule et al. | |
| 10,216,814 B2 | 2/2019 | Allan et al. | |
| 10,229,175 B2 | 3/2019 | Candea et al. | |
| 10,346,374 B1* | 7/2019 | Johnson | G06F 16/214 |
| 10,635,656 B1 | 4/2020 | Clark et al. | |
| 2007/0008985 A1 | 1/2007 | Lakshmanamurthy et al. | |
| 2007/0136324 A1 | 6/2007 | Xu et al. | |
| 2007/0179833 A1 | 8/2007 | Moorthy et al. | |
| 2008/0092112 A1 | 4/2008 | Jin et al. | |
| 2008/0195430 A1* | 8/2008 | Rustagi | G06Q 10/06395 705/7.41 |
| 2009/0228340 A1* | 9/2009 | Bohannon | G06Q 10/107 709/204 |
| 2009/0282089 A1 | 11/2009 | Lakshmanachar et al. | |
| 2010/0281061 A1 | 11/2010 | Chen | |
| 2011/0047525 A1 | 2/2011 | Castellanos et al. | |
| 2011/0055147 A1 | 3/2011 | Joerg et al. | |
| 2011/0161946 A1 | 6/2011 | Thomson et al. | |
| 2013/0086010 A1 | 4/2013 | Wenzel et al. | |
| 2013/0275393 A1 | 10/2013 | Kaldas et al. | |
| 2014/0025645 A1 | 1/2014 | Brown et al. | |
| 2016/0162521 A1 | 6/2016 | Pradhan et al. | |
| 2017/0220654 A1 | 8/2017 | De et al. | |
| 2018/0150529 A1 | 5/2018 | Mcpherson et al. | |
| 2018/0218069 A1* | 8/2018 | Rege | G06F 16/9014 |
| 2019/0079981 A1 | 3/2019 | Dhayapule et al. | |
| 2020/0334267 A1 | 10/2020 | Ramanathan et al. | |

FOREIGN PATENT DOCUMENTS

| | | |
|---|---|---|
| GB | 2505184 A | 2/2014 |
| GB | 201417129 | 11/2014 |
| GB | 2528066 A | 1/2016 |

* cited by examiner

CORRECTING DATA ERRORS FOR DATA PROCESSING FAULT RECOVERY

TECHNICAL FIELD

The present disclosure relates generally to resolving data errors, and more specifically to correcting data errors to recover from data processing faults.

BACKGROUND

In computing systems, Extract, Transform, Load (ETL) is a type of data integration method that refers to the three steps (extract, transform, load) used to blend data from multiple sources. ETL is often used to build a data warehouse. During this process, data is taken (extracted) from a source system, converted (transformed) into a format that can be analyzed by one or more target systems, and stored (loaded) into a data warehouse or other system. ETL processes use pre-defined logic in order to transform data from various source systems. However, ETL processes may fail when the received data is faulty and includes errors. ETL data processing failures may cause breaches of service level agreements (SLAs) between computing systems and disruption in a data processing environment using the ETL processes, especially when the transformed data is to be consumed by critical target systems.

SUMMARY

The system and methods implemented by the system as disclosed in the present disclosure provide technical solutions to the technical problems discussed above by suggesting alternative data values for erroneous data elements that can be processed successfully by an ETL tool and one or more target systems configured to process the data element. The disclosed system and methods provide several practical applications and technical advantages. For example, the disclosed system provides the practical application of detecting data processing errors in a computing system occurring as a result of erroneous data, and resolving the data processing errors by intelligently predicting alternative data values that can be processed by the computing system without errors. As disclosed in the following disclosure, the disclosed system detects data processing errors occurring in an ETL tool as a result of erroneous data fed into the ETL tool. The system resolves such ETL data processing errors by suggesting alternative data values that can be processed by the ETL tool and one or more target systems without errors.

The disclosed system provides an additional practical application of improving operational efficiency of a computing system by resolving data processing errors occurring in the computing system quickly and accurately. For example, intelligently suggesting alternative data values quickly and deploying the suggested data values in the computing system helps run the computing system at a higher level of efficiency by minimizing data processing disruptions.

In one or more embodiments, the disclosed system detects ETL data processing errors caused as a result of an erroneous data element received from a source system or application. An element value predictor (EVP) attempts to predict an alternative value for a data element based on historical records of the same data element previously received and processed by the ETL tool. The predicted data value is loaded into the ETL tool for re-processing of the data element. When the EVP is unable to predict an alternative value for the erroneous data element based on historical records of the data element, an error resolver determines a suggested value for the data element that can be successfully processed by ETL tool and/or successfully processed by one or more target systems configured to consume and process the data element.

Error resolver performs a multi-level assessment for the erroneous data element and suggests an appropriate data value based on the assessment. To perform the multi-level assessment, error resolver determines a plurality of probable data values for the data element. For each probable data value of the plurality of probable data values, error resolver verifies whether the probable data value can be processed successfully by the ETL tool and/or by one or more target systems configured to process the data element. This includes checking whether each of the probable data values satisfies one or more pre-defined data quality definitions and further checking whether a target application can perform further processing based on the probable data value without errors and achieve the desired results. If the error resolver can successfully perform the one or more processing steps for a probable data value and achieve desired results, the error resolver determines the probable data value as a suggested data value for the data element. The suggested data value of the data element can then be processed by the ETL without errors.

Thus, the system and methods described in this disclosure considerably improve the speed and accuracy for resolving data errors in an ETL based environment such as a data warehousing system. Resolving data errors quickly and accurately improves the processing efficiency of ETL based systems and helps avoid system wide delays and failures caused as a result of the data errors. Additionally, quick and accurate resolution of data errors saves ETL based systems from SLA breaches and disruption in critical processes relying on the ETL system to accurately transform data in a desired format/structure for use by the processes.

Certain aspects of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
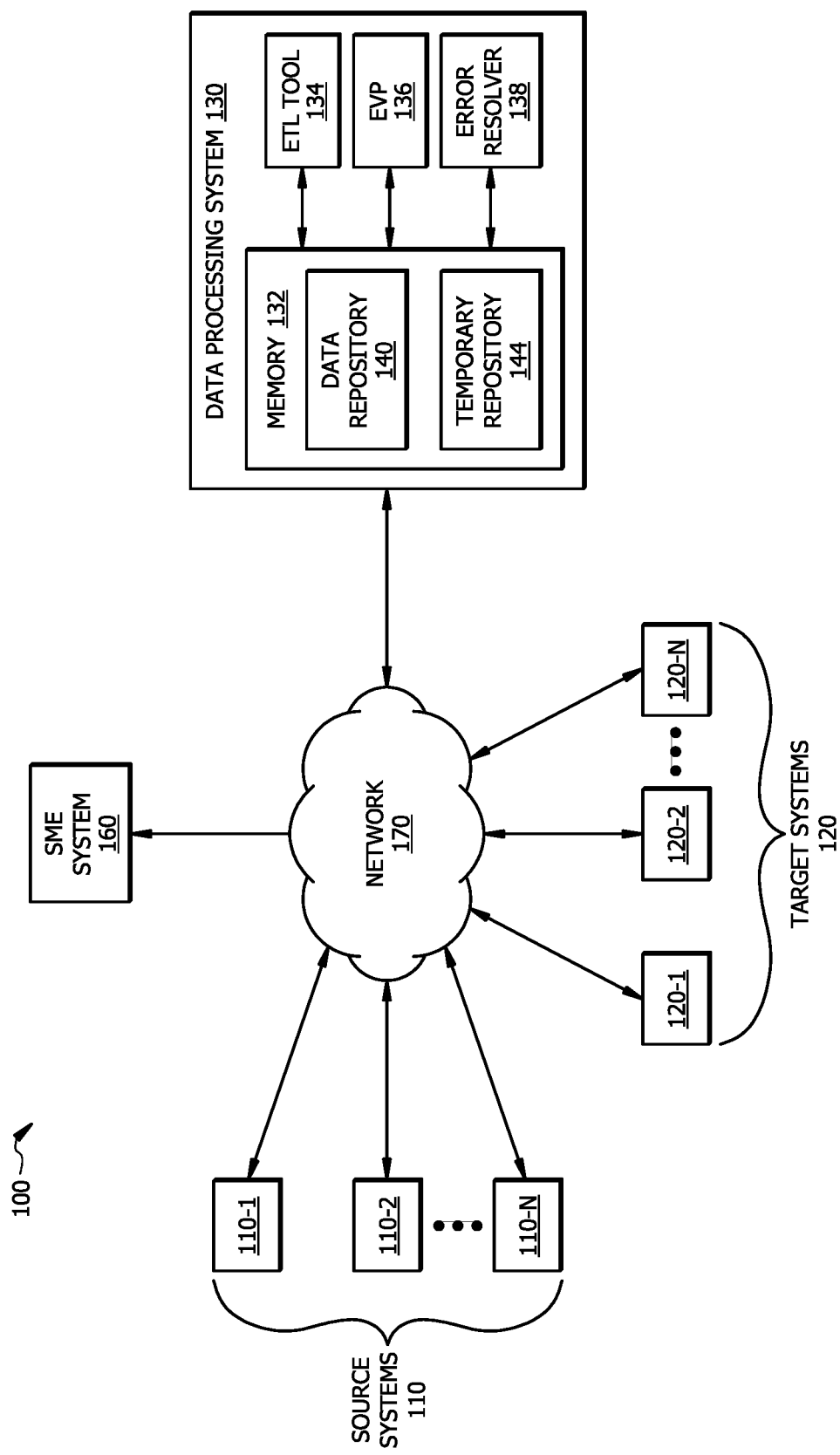
FIG. 1 is a schematic diagram of an example data warehousing system that can resolve data errors, in accordance with certain embodiments of the present disclosure.

ETL is a type of data integration method for copying data from one or more sources into a destination system which represents the data differently from the source(s) or in a different context than the source(s). Data extraction typically involves extracting data from homogeneous or heterogeneous sources. Data transformation includes processing data by transforming into a proper storage format/structure for the purposes of querying and analysis. Finally, data loading includes storing the data into a final target database such as an operational data store, a data mart, data lake or a data warehouse. The integrated data loaded by an ETL tool into the target database may be used by one or more target systems for data analysis and reporting. ETL is a proven method that many organizations rely on every day such as retailers who need to see sales data regularly. ETL can combine and surface transaction data from a warehouse or other data store so that it's ready for processing by a target system in a desired format. ETL is also used to migrate data from legacy systems to modern systems with different data formats. It's often used to consolidate data from organizational mergers, and to collect and join data from external suppliers or partners. For example, an organization may use ETL to integrate data from multiple operational system (e.g., marketing and sales). An operational system is a term used in data warehousing to refer to a system that is used to process the day-to-day transactions of an organization.

The ETL process uses ETL logic to transform data received from source systems into desired formats. The ETL logic typically includes a set of rules which is designed based on the target systems configured to further process the transformed data. For example, when migrating data from legacy source systems to modern target systems, ETL logic may be designed to transform data from one or more legacy formats as retained in the source system to a new format used by a modern target system. In one example use case, if an organization has been managing data in oracle databases previously and now wants to migrate the data to SQL server cloud database, ETL processes may be used to carry out the data migration based on ETL logic designed to transform data formats used by oracle databases to data formats used by SQL server.

In many cases, there may be errors in processing a data record received from a source system and the ETL tool may not be able to successfully transform and/or load the received data into a target repository in the desired format. The ETL data processing errors can often be attributed to erroneous data received from upstream systems. Data errors may include, but are not limited to, errors in values of received data elements and errors in metadata associated with received data elements such as data type, length, size and the like. For example, the ETL logic may attempt to process and load a name of a legal entity received from a source system which is currently configured to be 20 characters long. Thus, the ETL tool expects the legal entity name received from the source system to be 20 characters long. However, if the ETL tool receives a value of the legal entity name that is less or more than 20 characters, there may be a data processing error at the ETL tool, since the ETL tool is configured to identify and process 20 characters for the legal entity name. Accordingly, the ETL tool may be unable to successfully process and load this data element into a data repository (e.g., data warehouse). Further, in case the data is to be consumed by a critical target system, the ETL processing error/failure can breach SLA's which can cause disruptions in the data processing environment. Accordingly, it is important that ETL processing errors are resolved quickly and accurately.

Other examples of errors in received data records that can cause ETL processing errors include data type errors and data value errors. For example, ETL processing errors may occur when the ETL tool is expecting an integer value for a data element but receives a non-integer value. Another example of ETL processing error may include the ETL tool expecting to receive two decimal places for a data value but receiving a value having four decimal places.

Existing systems do not provide a swift and accurate resolution to ETL processing errors caused by errors in data received from source systems. To the contrary current methods used in the industry to resolve data errors are tedious and time consuming. In current systems, when an error takes place in ETL processing of data, support personnel must manually investigate the error to determine why the error took place, analyze the findings and determine how the error may be resolved. This process typically involves several steps.

For example, an ETL processing error may occur when the ETL tool receives a value for a legal entity name data element that is different in character size than what is configured for the data element. For example, ETL processing may fail as a result of receiving the legal entity name having 25 characters when the data element is set to 20 characters. In existing systems (e.g., a data warehouse system), once the ETL data processing error is detected, an application production support team investigates the ETL processing failure and determines that the ETL process for a data record has failed as a result of size mismatch of the legal entity name. The identified error is then passed on to an application development team which further investigates the error by comparing the last received data value (e.g., legal entity name) with previous records of the data value, and determines the exact nature of the size mismatch that caused the ETL error. For example, the application development team may determine that the legal entity name has changed from 20 characters to 25 characters in the latest instance of the data value received from the upstream application. The application development team reports back the findings back to the support team. The support team then queries the source system that sent the data record and provides information regarding the detected size mismatch of the legal entity name.

Upon receiving a query from the ETL support team, administrators of the source system manually check whether the data value was sent in error or the size of the legal entity name was intentionally changed. If the data was sent in error, the administrators of the source system may send a modified data record with the correct data value having the correct size (e.g., 20 characters) which is processed again by the ETL tool. On the other hand, if the size change was intentional, the ETL support team is informed of the change in size. The ETL support team accordingly configures the ETL tool with the new size of the legal entity data element so that further processing of the legal entity name data can be processed without errors.

As may be appreciated from the above discussion, the method currently followed to detect and resolve data errors that cause ETL processing errors is very tedious and time consuming.

Aspects of the present disclosure describe a system and methods implemented by the system that automatically resolve data errors quickly and accurately.

System Overview

FIG. 1 is a schematic diagram of an example data warehousing system 100 that can resolve data errors, in accordance with certain embodiments of the present disclosure. The system 100 may be implemented in any system that uses an ETL process such as a data warehousing system.

It may be noted that while the following disclosure describes methods for resolving data errors with reference to a data warehouse system, the disclosed system and methods equally apply to any system environment that uses an ETL process to integrate data from several source systems and/or applications.

As shown in FIG. 1, system 100 includes source systems 110 (including source systems 110-1, 110-2 to 110-N), target systems 120 (including target systems 120-1, 120-2 to 120-N), a data processing system 130 and a Subject Matter Expert (SME) system 160, each connected to a network 170. The network 170, in general, may be a wide area network (WAN), personal area network (PAN), a cellular network, or any other technology that allows devices to communicate electronically with other devices. In one or more embodiments, the network 170 may be the internet.

In one or more embodiments, each of the source systems 110, target systems 120, data processing system 130 and SME system 160 may be implemented by a computing device running one or more software applications. For example, one or more of the source systems 110, target systems 120, data processing system 130 and SME system 160 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the source systems 110, target systems 120, data processing system 130 and SME system 160 may be representative of a server running one or more software applications to implement respective functionality as described below. In certain embodiments, one or more of the source systems 110, target systems 120, data processing system 130 and SME system 160 may run a thin client software application where the processing is directed by the thin client but largely performed by a central entity such as a server (not shown).

Source systems 110 may include systems and applications run by those systems that provide data to the data processing system 130. For example, in a data migration use case as described above, source systems 110 may include legacy systems that store data in one or more legacy formats. Source systems 110 may also include operational systems of an organization that process data-to-day transactions of the organization. For example, in a banking use case, the source systems 110 may include front desk systems that process customer's loan applications, systems at individual bank branches that process funds deposit/withdrawal, trading systems processing financial trades and the like. In another example use case the source systems 110 may include systems that process and collect data related to payroll, sales and purchasing for a retailer. One or more of the source systems 110 may also include servers that store reference data common across an organization's systems including customer data, employee data, vendors data and the like.

Target systems 120 may include systems and software applications run by those systems that consume and process data received from the source systems 110. Target systems 120 may be configured to perform data analysis and reporting based on the data received from source systems 110. For example, in the data migration use case described above, a target system 120 may include a modem system that processes data in one or more new formats. In another example, one of the target systems 120 may include a cost accounting system of an organization that analyses data from payroll, sales and purchasing source systems 110 to generate fiscal reports. In a banking use case, a target system 120 may be a ledger system which collects data from several source bank systems and performs ledger balancing. Additionally or alternatively, target systems 120 may be configured to perform one or more processing steps based on the data received from source systems 110. For example, in the data migration use case, the target system 120 may be configured to perform data analysis and reporting based on data that was transformed to the one or more new formats.

Data Processing System

As shown in FIG. 1, data processing system 130 may include memory 132, ETL tool 134, Element Value Predictor (EVP) 136 and error resolver 138. Memory 132 may be configured to store a data repository 140 of the data warehousing system 100.

ETL Tool

ETL tool 134 may be configured to integrate data received from several source systems 110 and store the integrated data in the data repository 140. The ETL tool 134 is configured to perform three steps namely data extraction, data transformation and data loading. Data extraction involves extracting data from one or more source systems 110. Data transformation includes processing the received data by transforming into a pre-defined format or structure. Finally, data loading includes storing the transformed data into the data repository 140. The integrated data loaded into the data repository 140 may be accessed by one or more target systems 120 for further processing.

ETL tool 134 uses pre-defined ETL logic to transform data received from source systems 110 into desired formats. The ETL logic includes a set of rules which is designed based on data format and/or data structure requirements of the target systems 120 configured to further process the transformed data stored in the data repository 140. For example, when migrating data from legacy source systems 110 to modern target systems 120, the ETL logic may be designed to transform data from one or more legacy formats as retained in the source system 110 to a new format used by a modern target system 120. In one example use case, if an organization has been managing data in oracle databases previously and now wants to migrate the data to SQL server cloud database, ETL processes may be used to carry out the data migration based on ETL logic designed to transform data formats used by oracle databases to data formats used by SQL server.

In many cases, data received from one or more source systems 110 may be erroneous and such erroneous data may cause processing errors at the ETL tool 134. Data errors may include, but are not limited to, errors in values of received data elements and errors in metadata associated with received data elements such as data type, length, size and the like. For example, ETL tool 134 may attempt to process and load a name of a legal entity received from a source system 110, wherein the legal entity name is configured to be 20 characters long. Thus, the ETL tool 134 expects the legal entity name received from the source system 110 to be 20 characters long. However, if the ETL tool 134 receives a value of the legal entity name that is less or more than 20 characters, this unexpected data size may cause a data processing error at the ETL tool 134, since the ETL tool 134 is configured to identify and process 20 characters for the legal entity name. Accordingly, the ETL tool 134 may be unable to successfully process and load this data element into the data repository 140.

The term "data element" may refer to a data record including one or more data values and metadata associated with the data record (e.g., data type, size etc.) or a single data value with associated metadata (data type, size etc.).

Element Value Predictor (EVP)

EVP 136 may be configured to predict a value for a data element based on historical records of the same data element previously received and processed by the ETL tool 134. For example, the EVP 136 looks back in time (e.g., 3 months to 1 year) and examines previously received values of the data element that were successfully processed by the ETL tool 134. EVP 136 predicts a value of the data element based on the history of the data element values received from one or more source systems 110. For example, if EVP 136 has consistently (e.g., a minimum threshold number of times) received a same particular value for the data element for the past 3 months, the EVP returns the particular value as the predicted value of the data element. For example, the data processing system 130 may receive a legal entity name as "XYZ corporation-NA" and the ETL tool may fail to process the legal entity name as the received name does not match a format for the legal entity name configured at the ETL tool 134. In response to the data processing system 130 detecting this data error, the EVP 136 may attempt to predict an alternative value for the legal entity name. EVP 136 may examine the values of the legal entity name data element received for the past 3 months and determine that the data processing system 130 has consistently received "XYZ corporation-North America" as the value of the data element from one or more source systems 110 for the past 3 months, and further determine that ETL tool 134 has consistently (e.g., for the past 3 months) processed the value "XYZ corporation-North America" successfully. In response, EVP 136 may determine "XYZ corporation-North America" as the predicted value for the legal entity name. Once EVP 136 predicts a value of a data element, the predicted value may be reprocessed by the ETL tool 134 and results of the ETL processing may be stored in the data repository 140.

In one or more embodiments, a predicted value of a data element may include a data change, a system change or both as compared to the received data element. A system change may include changes to the nature of the data (e.g., metadata such as data type, data size etc.). For example, when the erroneous data value is 25 characters long and the predicted data value is 20 characters long, this change is considered a system change. System changes typically cannot be directly loaded back into the ETL tool 134 for processing. System changes generally result in changes to the schema and need to be deployed first before the changes can be processed by the ETL tool 134. In one embodiment, system changes may be deployed using a hot deploy mechanism.

A data change may include a change in the value of the data element that does not result in any system changes. For example, a predicted value of a received erroneous data element may include changes to the data value only without any changes to the metadata (e.g., data type, size etc.) associated with the data element. For example, the erroneous data value received from a source system 110 may include "XYZ corporation" with a couple of stray dots on top of 'XYZ'. A predicted value of this data element may be "XYZ Corporation" without the two dots on top of "XYZ". This predicted data value results in a data change only. Data changes can be directly uploaded into the ETL tool 134 without deployment.

In one or more embodiments, EVP 136 is implemented by an artificial intelligence (AI) machine learning model that is trained using historical data values of data records received from source systems 110. The trained machine learning model predicts values of data elements based on the historical data records.

In one or more embodiments, a predicted value of a data element generated by EVP 136 is validated by the SME system 160 before being deployed (e.g., for system changes) and/or forwarded to the ETL tool for processing. The predicted values may be deployed and/or loaded into the ETL tool 134 only after the SME system successfully validates the predicted values generated by EVP 136.

Error Resolver

In some cases, EVP 136 may be unable to successfully predict a value for an erroneous data element based on historical records of the data element. Error resolver 138 may be configured to resolve data errors that cannot be resolved by EVP 136. In one or more embodiments, one or more data records which EVP 136 is unable to predict values for, are processed by error resolver 138. In one or more alternative embodiments, one or more data records that cannot be successfully processed by ETL tool 134 are forwarded directly to error resolver 138 without being processed by EVP 136.

Error resolver 138 is configured to perform a multi-level assessment for each erroneous data element and suggest an appropriate data value based on the assessment. To perform the multi-level assessment, error resolver 138 determines for each erroneous data element, a plurality of probable data values for the data element. For example, if the erroneous value of a legal entity name data element was received as "XYZ Corporation-NA", other probable data values of the data element may include XYZ-NA, XYZ, XYZ Corp, XYZ-Corp-NA, XYZ Corporation-North America, XYZ Corp-North America and the like.

In one or more embodiments, the multi-level assessment performed by the error resolver 138 may include the error resolver 138 checking for each probable data value of the data element, whether the probable data value satisfies one or more pre-defined data quality definitions. The pre-defined data quality definitions against which a probable data value may be validated may include, but are not limited to, one or more of data integrity definitions, data semantics definitions, definitions relating to functional dependencies of the data element, definitions against data redundancies and definitions against data anomalies. Data integrity definitions check whether the probable data value satisfies pre-defined integrity constraints such as pre-defined foreign key constraints and primary key constraints between data tables. Data semantics definitions check whether the probable data value satisfies pre-defined data semantics including whether the data value has a correct data type (e.g., number type, string type), is assigned a correct column name and the like. Definitions relating to functional dependencies check whether the probable data value satisfies pre-defined functional dependencies with other data such as dependency on data from another data table. Definitions against data redundancies check for data redundancies such as data duplication. Definitions against other data anomalies check for vagueness in the probable data value. For example, the probable data value cannot include a string when a number value is expected for the data element. The error resolver 138 may be configured to reject probable data values of the data element that do not satisfy one or more of the above pre-defined data quality definitions.

In one or more embodiments, the multi-level assessment performed by the error resolver 138 may additionally or alternatively include the error resolver 138 checking whether each probable data value fits into the landscape of the target system 120 consuming the data value. For example, this means checking whether the target system 120 can perform further processing based on the probable data value without errors and achieve the desired results. To perform this check, error resolver 138 generates a temporary repository 144 and loads the probable data values of the data element in the temporary repository. The temporary repository 144 is a replica of at least a portion of the production data repository 140 from which target systems 120 consume data and perform further processing steps based on the data. For each probable data value loaded in the temporary repository 144, error resolver 138 runs one or more processing steps based on the probable data value, wherein the one or more processing steps may include the corresponding processing steps one or more target systems 120 are configured to perform based on the data value of the data element loaded in the data repository by the ETL tool 134. The one or more processing steps may also include ETL processing that would be performed by the ETL tool 134 if the probable data value is loaded into the ETL tool 134. If the error resolver 138 is unable to successfully perform the one or more processing steps based on a probable data value of the erroneous data element, error resolver 138 may discard the probable data value and process the next probable data value of the data element. On the other hand, if error resolver 138 can successfully perform the one or more processing steps for a probable data value, error resolver 138 determines the probable data value as a suggested data value for the data element. In an embodiment, error resolver 138 may continue to perform the one or more processing steps based on the probable data values of the data element until error resolver 138 can determine a suggested data value for the data element. In an alternative embodiment, error resolver 138 performs the one or more processing steps on all probable data values of the data element determined by the error resolver 138. In this case, error resolver 138 determines as the suggested data value, one of the probable data values that yielded a highest success rate in performing the one or more processing steps.

For example, in the data migration use case described above, when data processing system 130 receives an erroneous data element from a legacy source system 110 that stores data in one or more legacy formats, error resolver may determine a plurality of probable data values of the data element. For each probable data value, error resolver 138 checks whether the probable data element satisfies one or more pre-defined data quality definitions and further performs data analysis and reporting operations based on the probable data value similar to the data analysis and reporting operations a modern target system 120 performs based on transformed data in a new format as stored in the data repository 140. Error resolver 138 determines as the suggested data value of the data element, a probable data value that satisfies one or more pre-defined data quality definitions and yields successfully results for the data analysis and reporting operations.

If the suggested data value of the data element determined by error resolver 138 results merely in a data change as compared to the received data element, the suggested data value is directly processed by the ETL tool 134. However, if the suggested data value results in a system change, data processing system 130 deploys the system change before processing by ETL tool 134.

In one or more embodiments, a suggested data value of a data element generated by error resolver 138 is validated by the SME system 160 before being deployed (e.g., for system changes) and/or forwarded to the ETL tool for processing. The suggested data values may be deployed and/or loaded into the ETL tool 134 only after the SME system successfully validates the suggested values generated by error resolver 138.

In one or more embodiments, the temporary repository 144 is meant to be a temporary version of the data repository 140 and may be deleted once error resolver 138 successfully determines a suggested data value for an erroneous data element. For example, error resolver 138 may create a new version of the temporary repository 144 for processing each erroneous data element and may delete the new version of the temporary repository 144 after determining a suggested value of the data element.

Figure 2:
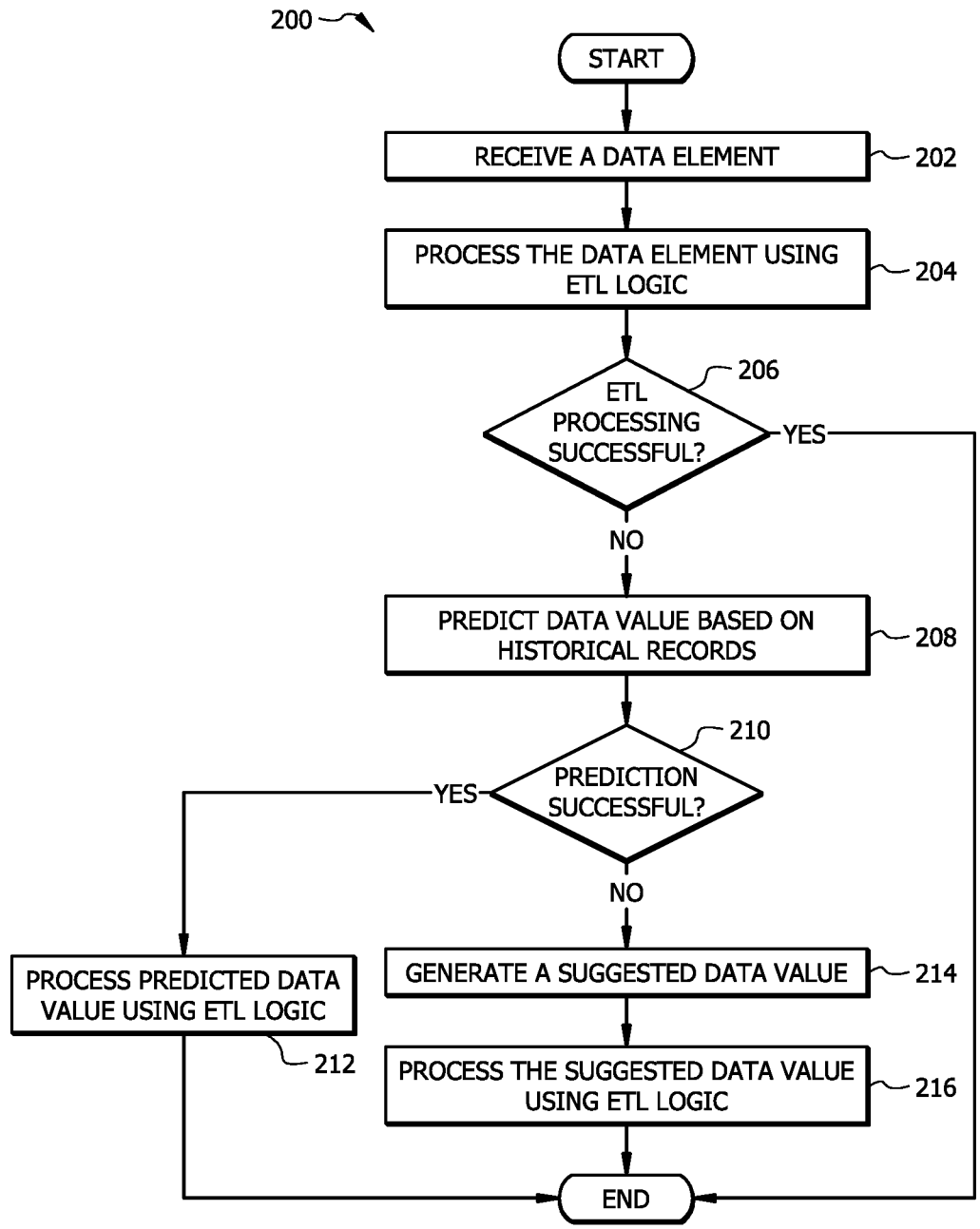
FIG. 2 is a flowchart of an example method for recovering from data processing errors by detecting and correcting data errors, in accordance with certain embodiments of the present disclosure.

FIG. 2 is a flowchart of an example method 200 for recovering from data processing errors by detecting and correcting data errors, in accordance with certain embodiments of the present disclosure. Method 200 may be performed by data warehousing system 100 as shown in FIG. 1 and described above.

At step 202, data processing system 130 receives a data element from a source system 110. The term "data element" may refer to a data record including one or more data values and metadata associated with the data record (e.g., data type, size etc.) or a single data value with associated metadata (data type, size etc.). Source systems 110 may include systems and applications run by those systems that provide data to the data processing system 130. For example, in a data migration use case as described above, source systems 110 may include legacy systems that store data in one or more legacy formats. Source system 110 may also include operational systems of an organization that process data-to-day transactions of the organization. Source systems 110 may also include one or more servers that store reference data common across an organization's systems including customer data, employee data, vendors data and the like.

At step 204, the received data element is processed by an ETL logic. For example, the received data element is processed by ETL tool 134.

ETL tool 134 may be configured to integrate data received from several source systems 110 and store the integrated data in data repository 140. ETL tool 134 is configured to perform three steps namely data extraction, data transformation and data loading. Data extraction involves extracting data from one or more source systems 110. Data transformation includes processing the received data by transforming into a pre-defined format or structure. Finally, data loading includes storing the transformed data into the data repository 140. The integrated data loaded into the data repository 140 may be accessed by one or more target systems 120 for further processing. Processing of the data element by the ETL tool may include data transformation of the received data element and loading the transformed data element in the data repository 140.

ETL tool 134 uses pre-defined ETL logic to transform the data element received from the source system 110 into a pre-configured format. The ETL logic includes a set of rules which is designed based on format requirements of the target systems 120 configured to further process the transformed data element stored in the data repository 140. For example, when migrating data from legacy source systems 110 to modern target systems 120, the ETL logic may be designed to transform data from one or more legacy formats as retained in the source system 110 to a new format used by a modern target system 120. In one example use case, if an organization has been managing data in oracle databases previously and now wants to migrate the data to SQL server cloud database, ETL processes may be used to carry out the data migration based on ETL logic designed to transform data formats used by oracle databases to data formats used by SQL server.

At step 206, data processing system 130 checks whether processing of the data element by the ETL tool was successful. If the ETL tool 134 was able to successfully process the data element, that is successfully transform the data element and load the transformed data element into the data repository 140, method 200 ends here. However, in certain cases, ETL tool 134 may not successfully process the data element based on the pre-configured ETL logic.

In many cases, data received from one or more source systems 110 may be erroneous and such erroneous data may cause processing errors at the ETL tool 134. Data errors may include, but are not limited to, errors in values of received data elements and errors in metadata associated with received data elements such as data type, length, size and the like. For example, ETL tool 134 may be configured to recognize a legal entity name that is 20 characters long. Thus, when the data element received from the source system 110 includes a name of the legal entity, ETL tool 134 expects the legal entity name to be 20 characters long. However, if the data element includes a legal entity name that is less or more than 20 characters, this unexpected data size may cause a data processing error at the ETL tool 134, since the ETL tool 134 is configured to identify and process 20 characters for the legal entity name. Accordingly, the ETL tool 134 may be unable to successfully transform and load this data element into the data repository 140, causing a data processing error at the ETL tool 134.

If data processing system 130 detects (at step 206) that ETL tool 134 was unable to successfully process the data element as a result of an error in the data element, method 200 proceeds to step 208.

At step 208, EVP 136 predicts a revised/corrected data value for the data element based on historical records of the data element.

EVP 136 may be configured to predict a value for a data element based on historical records of the same data element previously received and processed by the ETL tool 134. For example, the EVP 136 looks back in time (e.g., 3 months to 1 year) and examines previously received values of the data element that were successfully processed by the ETL tool 134. EVP 136 predicts a value of the data element based on the history of the data element values received from one or more source systems 110. For example, if EVP 136 has consistently (e.g., a minimum threshold number of times) received a same particular value for the data element for the past 3 months, the EVP returns the particular value as the predicted value of the data element. For example, when the data element is a legal entity name and the data processing system 130 receives a legal entity name as "XYZ corporation-NA", the ETL tool may fail to process the legal entity name if the received name does not match a format for the legal entity name configured at the ETL tool 134. In response to the data processing system 130 detecting this data error, EVP 136 may attempt to predict an alternative value for the legal entity name. EVP 136 may examine the values of the legal entity name data element received for the past 3 months and determine that the data processing system 130 has consistently received "XYZ corporation-North America" as the value of the data element from one or more source systems 110 for the past 3 months, and further determine that ETL tool 134 has consistently (e.g., for the past 3 months) processed the value "XYZ corporation-North America" successfully. In response, EVP 136 may determine "XYZ corporation-North America" as the predicted value for the legal entity name.

In one or more embodiments, a predicted value of a data element may include a data change, a system change or both as compared to the received data element. A system change may include changes to the nature of the data (e.g., metadata such as data type, data size etc.). For example, when the erroneous data value is 25 characters long and the predicted data value is 20 characters long, this change is considered a system change. System changes typically cannot be directly loaded back into the ETL tool 134 for processing. System changes generally result in changes to the schema and need to be deployed first before the changes can be processed by the ETL tool 134. In one embodiment, system changes may be deployed using a hot deploy mechanism.

A data change may include a change in the value of the data element that does not result in any system changes. For example, a predicted value of a received erroneous data element may include changes to the data value only without any changes to the metadata (e.g., data type, size etc.) associated with the data element. For example, the erroneous data value received from a source system 110 may include "XYZ corporation" with a couple of stray dots on top of 'XYZ'. A predicted value of this data element may be "XYZ Corporation" without the two dots on top of "XYZ". This predicted data value results in a data change only. Data changes can be directly uploaded into the ETL tool 134 without deployment.

In one or more embodiments, EVP 136 is implemented by an artificial intelligence (AI) machine learning model that is trained using historical data values of data records received from source systems 110. The trained machine learning model predicts values of data elements based on the historical data records. For example, the machine learning model may be trained based on historical records of the data element including previously received instances of the data element for a predetermined time period in the past which were successfully processed by ETL tool 134. The predetermined time period may be a data, few days, a week, few weeks, a month few months, a year, few years or any other appropriate time period.

At step 210, data processing system 210 checks whether EVP 136 successfully predicted an alternative value for the erroneous data element based on historical records of the data element. If EVP 136 successfully predicted a data value, method 200 proceeds to step 212 where the predicted data value may be directly re-loaded into the ETL tool 134 (e.g., when the predicted value causes data change only) or deployed before loading into the ETL tool 134 (e.g., when the predicted value causes a system change).

However, when EVP 136 fails to predict a data value of the data element based on the historical records of the data element, method 200 proceeds to step 214.

At step 214, error resolver 138 determines a suggested value for the data element that can be successfully processed by ETL tool and/or successfully processed by one or more target systems 120 configured to consume and process the data element from the data repository 140.

In some cases, EVP 136 may be unable to successfully predict a value for an erroneous data element based on historical records of the data element. Error resolver 138 may be configured to resolve data errors that cannot be resolved by EVP 136. In one or more embodiments, one or more data elements which EVP 136 is unable to predict values for, are processed by error resolver 138. It may be noted that in one or more alternative embodiments, one or more data elements that cannot be successfully processed by ETL tool 134 are forwarded directly to error resolver 138 without being processed by EVP 136.

Error resolver 138 is configured to perform a multi-level assessment for each erroneous data element and suggest an appropriate data value based on the assessment. To perform the multi-level assessment, error resolver 138 determines a plurality of probable data values for the data element. For example, if the erroneous value of a legal entity name data element was received as "XYZ Corporation-NA", other probable data values of the data element may include XYZ-NA, XYZ, XYZ Corp, XYZ-Corp-NA, XYZ Corporation-North America, XYZ Corp-North America and the like.

For each probable data value of the plurality of probable data values, error resolver 138 is configured to verify whether the probable data value can be processed successfully by the ETL tool 134 and/or by one or more target systems 130 configured to process the data element.

In one or more embodiments, for each probable data value of the data element, error resolver 138 checks whether the probable data value satisfies one or more pre-defined data quality definitions. The pre-defined data quality definitions against which a probable data value may be checked may include, but are not limited to, one or more of data integrity definitions, data semantics definitions, definitions relating to functional dependencies of the data element, definitions against data redundancies and definitions against data anomalies. Data integrity definitions check whether the probable data value satisfies pre-defined integrity constraints such as pre-defined foreign key constraints and primary key constraints between data tables. Data semantics definitions check whether the probable data value satisfies pre-defined data semantics including whether the data value has a correct data type (e.g., number type, string type), is assigned a correct column name and the like. Definitions relating to functional dependencies check whether the probable data value satisfies pre-defined functional dependencies with other data such as dependency on data from another data table. Definitions against data redundancies check for data redundancies such as data duplication. Definitions against other data anomalies check for vagueness in the probable data value. For example, the probable data value cannot include a string when a number value is expected for the data element. The error resolver 138 may reject probable data values of the data element that do not satisfy one or more of the above pre-defined data quality definitions.

In one or more embodiments, error resolver 138 checks whether each probable data value fits into the landscape of the target system 120 that is to further process the data value. This includes error resolver 138 checking whether the target system 120 can perform further processing based on the probable data value without errors and achieve the desired results. To perform this check, error resolver 138 generates a temporary repository 144 and loads the probable data values of the data element in the temporary repository. The temporary repository 144 is a replica of at least a portion of the production data repository 140 from which target systems 120 consume data and perform further processing steps based on the data. For each probable data value loaded in the temporary repository 144, error resolver 138 runs one or more processing steps based on the probable data value, wherein the one or more processing steps may include corresponding processing steps one or more target systems 120 are configured to perform based on the data value of the data element when loaded in the data repository 140 by the ETL tool 134. Additionally or alternatively, the one or more processing steps may also include ETL processing that would be performed by the ETL tool 134 if the probable data value is loaded into the ETL tool 134.

If the error resolver 138 is unable to successfully perform the one or more processing steps based on a probable data value of the erroneous data element, error resolver 138 may discard the probable data value and move on to process the next probable data value of the data element. On the other hand, if error resolver 138 can successfully perform the one or more processing steps for a probable data value, error resolver 138 stops processing other probable data values and determines the probable data value as a suggested data value for the data element. In an embodiment, error resolver 138 may continue to perform the one or more processing steps based on the probable data values of the data element until error resolver 138 can determine a suggested data value for the data element. In an alternative embodiment, error resolver 138 performs the one or more processing steps on all probable data values of the data element determined by the error resolver 138. In this case, error resolver 138 determines as the suggested data value, one of the probable data values that yielded a highest success rate in performing the one or more processing steps.

For example, in the data migration use case described above, when data processing system 130 receives an erroneous data element from a legacy source system 110 that stores data in one or more legacy formats, error resolver may determine a plurality of probable data values for the erroneous data element. For each probable data value, error resolver 138 checks whether the probable data element satisfies one or more pre-defined data quality definitions and further performs data analysis and reporting operations based on the probable data value similar to the data analysis and reporting operations a modern target system 120 performs based on transformed data in a new format as stored in the data repository 140. Error resolver 138 determines as the suggested data value of the data element, a probable data value that satisfies one or more pre-defined data quality definitions and yields successfully results for the data analysis and reporting operations.

At step 216, ETL tool 134 processes the suggested data value of the data element determined by error resolver 138. If the suggested data value of the data element determined by error resolver 138 results merely in a data change as compared to the data element received from the source system 110, the suggested data value is directly processed by the ETL tool 134. However, if the suggested data value results in a system change (e.g., data type change, data size change etc.), data processing system 130 deploys the system change based on the suggested data value of the data element before processing by ETL tool 134.

Figure 3:
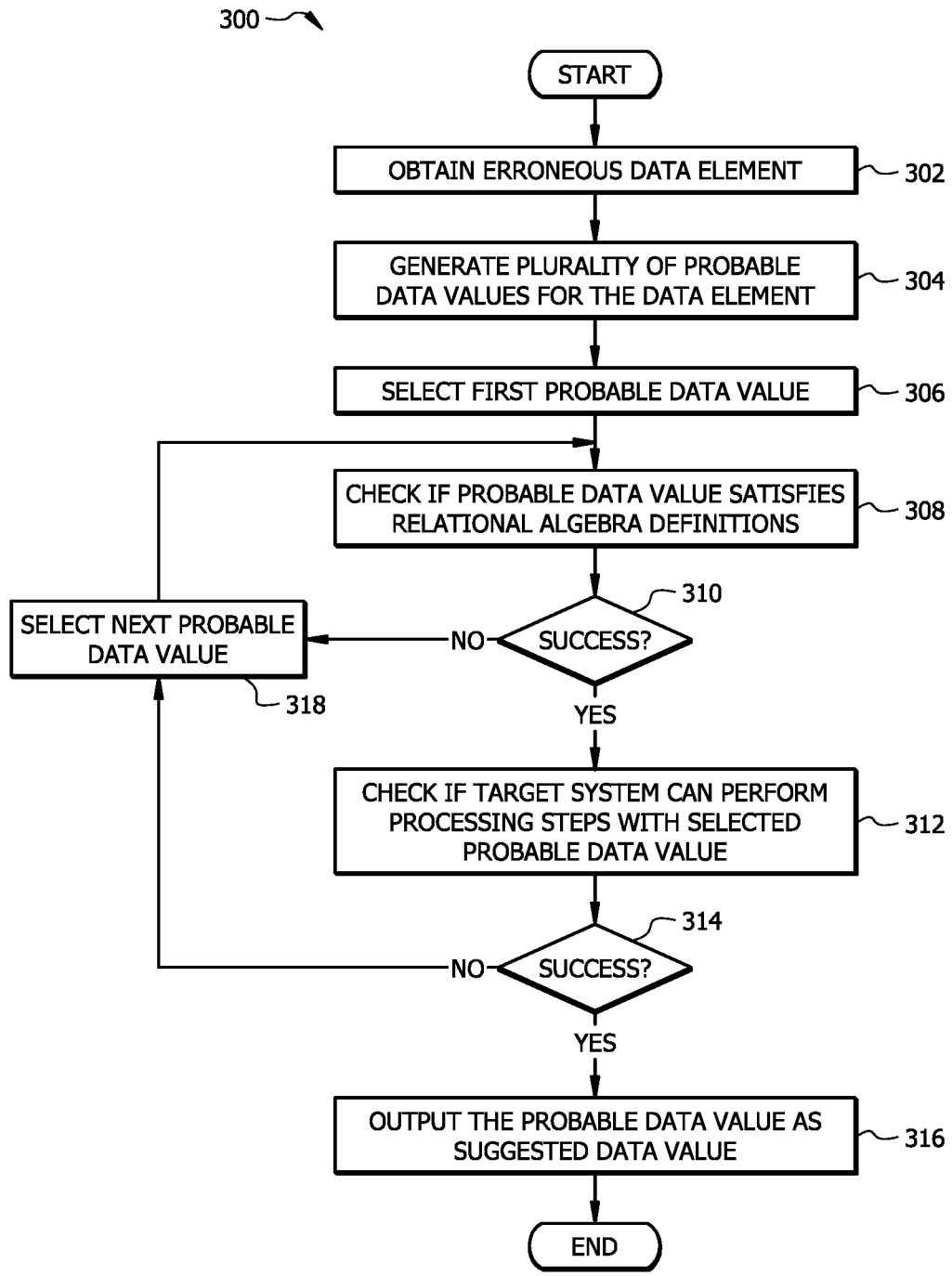
FIG. 3 is a flowchart of an example method for correcting data errors, in accordance with certain embodiments of the present disclosure.

FIG. 3 is a flowchart of an example method 300 for correcting data errors, in accordance with certain embodiments of the present disclosure. Method 300 may be performed by error resolver 138 as shown in FIG. 1 and described above.

At step 302, error resolver 138 obtains an erroneous data element received from a source system 110.

As described above, in many cases, data received from one or more source systems 110 may be erroneous and such erroneous data may cause processing errors at the ETL tool 134. Data errors may include, but are not limited to, errors in values of received data elements and errors in metadata associated with received data elements such as data type, length, size and the like. For example, ETL tool 134 may be configured to recognize a legal entity name that is 20 characters long. Thus, when the data element received from the source system 110 includes a name of the legal entity, ETL tool 134 expects the legal entity name to be 20 characters long. However, if the data element includes a legal entity name that is less or more than 20 characters, this unexpected data size may cause a data processing error at the ETL tool 134, since the ETL tool 134 is configured to identify and process 20 characters for the legal entity name. Accordingly, the ETL tool 134 may be unable to successfully transform and load this data element into the data repository 140, causing a data processing error at the ETL tool 134.

In some cases, error resolver 138 obtains the erroneous data element received from the source system 110 when data processing system 130 detects that the ETL tool 134 failed to process the data element. In an alternative embodiment, EVP 136 attempts to predict an alternative data value for the data element in response to ETL tool 134 failing to process the data element. As described above, EVP 136 attempts to predict an alternative data value for the data element based on historical records of the data element previously received from one or more source systems. In this case, error resolver 138 obtains the data element for processing only when the EVP 136 fails to predict an alternative data value of the data element based on historical records of the data element.

At step 304, error resolver 138 generates a plurality of probable data values for the data element.

Error resolver 138 is configured to perform a multi-level assessment for each erroneous data element and suggest an appropriate data value based on the assessment. To perform the multi-level assessment, error resolver 138 determines a plurality of probable data values for the data element. For example, if the erroneous value of a legal entity name data element was received as "XYZ Corporation-NA", other probable data values of the data element may include XYZ-NA, XYZ, XYZ Corp, XYZ-Corp-NA, XYZ Corporation-North America, XYZ Corp-North America and the like.

At step 306, error resolver 138 selects a first probable data value from the plurality of probable data values generated by error resolver 138. In one embodiment, error resolver 138 creates a list of the probable data values and selects the probable data values for the list one by one for processing. Error resolver 138 may select probable data values from the list in any order including ascending order, descending order or randomly.

At step 308, error resolver checks if the selected probable data value satisfies one or more data quality definitions.

As described above, for each probable data value of the plurality of probable data values, error resolver 138 is configured to verify whether the probable data value can be processed successfully by the ETL tool 134 and/or by one or more target systems 130 configured to process the data element. As part of the verifying, error resolver 138 checks whether the selected probable data value satisfies the one or more pre-defined data quality definitions. The pre-defined data quality definitions against which the probable data value is checked may include, but are not limited to, one or more of data integrity definitions, data semantics definitions, definitions relating to functional dependencies of the data element, definitions against data redundancies and definitions against data anomalies. Data integrity definitions check whether the probable data value satisfies pre-defined integrity constraints such as pre-defined foreign key constraints and primary key constraints between data tables. Data semantics definitions check whether the probable data value satisfies pre-defined data semantics including whether the data value has a correct data type (e.g., number type, string type), is assigned a correct column name and the like. Definitions relating to functional dependencies check whether the probable data value satisfies pre-defined functional dependencies with other data such as dependency on data from another data table. Definitions against data redundancies check for data redundancies such as data duplication. Definitions against other data anomalies check for vagueness in the probable data value. For example, the probable data value cannot include a string when a number value is expected for the data element. The error resolver 138 may reject probable data values of the data element that do not satisfy one or more of the above pre-defined data quality definitions.

At step 310, error resolver 138 checks if the selected probable data value satisfied the one or more pre-configured data quality definitions. If the probable data value failed to satisfy the one or more data quality definitions, method 300 proceeds to method step 318 where error resolver 138 selects the next probable data value for processing. However, if the probable data value satisfied the one or more data quality definitions, method 300 proceeds to step 312.

At step 312, error resolver checks if a target system 120 configured to process the data element can perform one or more processing steps based on the selected probable data value.

In one or more embodiments, error resolver 138 checks whether each probable data value fits into the landscape of the target system 120 that is to further process the data value. This includes error resolver 138 checking whether the target system 120 can perform further processing based on the probable data value without errors and achieve the desired results. To perform this check, error resolver 138 generates a temporary repository 144 and loads the probable data values of the data element in the temporary repository. The temporary repository 144 is a replica of at least a portion of the production data repository 140 from which target systems 120 consume data and perform further processing steps based on the data. For each probable data value loaded in the temporary repository 144, error resolver 138 runs one or more processing steps based on the probable data value, wherein the one or more processing steps may include corresponding processing steps one or more target systems 120 are configured to perform based on the data value of the data element when loaded in the data repository 140 by the ETL tool 134. Additionally or alternatively, the one or more processing steps may also include ETL processing that would be performed by the ETL tool 134 if the probable data value is loaded into the ETL tool 134.

At step 314, error resolver 138 checks if the one or more processing steps were performed successfully based on the selected probable data value (e.g., loaded in the temporary repository 144).

If the error resolver 138 was unable to successfully perform the one or more processing steps based on the probable data value, error resolver 138 discards the probable data value. Method 300 proceeds to step 318, where error resolver 138 selects the next probable data value for processing. On the other hand, if error resolver 138 successfully performed the one or more processing steps for the probable data value, method 300 proceeds to step 316 where error resolver 138 determines the probable data value as a suggested data value for the data element.

In an alternative embodiment, error resolver 138 performs the one or more processing steps on all probable data values of the data element determined by the error resolver 138. In this case, error resolver 138 determines as the suggested data value, one of the probable data values that yielded a highest success rate in performing the one or more processing steps.

Figure 4:
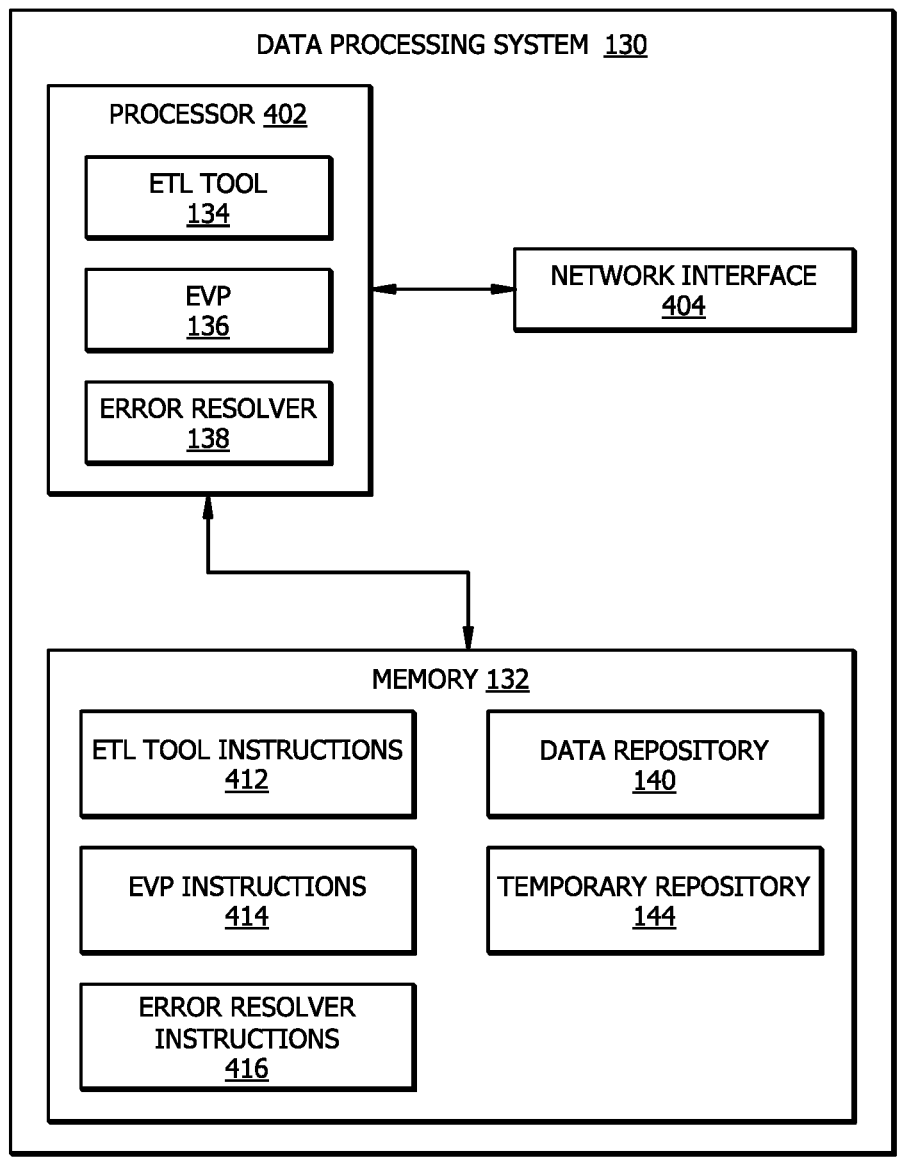
FIG. 4 illustrates an example schematic diagram of the data processing system illustrated in FIG. 1, in accordance with one or more embodiments of the present disclosure.

FIG. 4 illustrates an example schematic diagram of the data processing system 130 illustrated in FIG. 1, in accordance with one or more embodiments of the present disclosure.

Data processing system 130 includes a processor 402, a memory 132, and a network interface 404. The data processing system 130 may be configured as shown in FIG. 4 or in any other suitable configuration.

The processor 402 comprises one or more processors operably coupled to the memory 132. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 114. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (ETL tool instructions 412, EVP instructions 414 and error resolver instructions 416) to implement the ETL tool 134, EVP 136 and error resolver 138. In this way, processor 402 may be a special-purpose computer designed to implement the functions disclosed herein. In one or more embodiments, each of the ETL tool 134, EVP 136 and error resolver 138 is implemented using logic units, FPGAs, ASICs, DSPs, or any other suitable hardware. Each of the ETL tool 134, EVP 136 and error resolver 138 is configured to operate as described with reference to FIGS. 1-3. For example, each of the ETL tool 134, EVP 136 and error resolver 138 may be configured to perform at least a portion of the flowcharts 200 and 300 as described in FIG. 2 and FIG. 3.

The memory 132 comprises one or more disks, tape drives, or solid-state drives, and may be used as an over-flow data storage device, to store programs when such programs are selected for execution, and to store instructions and data that are read during program execution. The memory 132 may be volatile or non-volatile and may comprise a read-only memory (ROM), random-access memory (RAM), ternary content-addressable memory (TCAM), dynamic random-access memory (DRAM), and static random-access memory (SRAM).

The memory 132 is operable to store ETL tool instructions 412, EVP instructions 414 and error resolver instructions 416 and/or any other data or instructions such as data repository 140 and temporary repository 144. Each of the ETL tool instructions 412, EVP instructions 414 and error resolver instructions 416 may include any suitable set of instructions, logic, rules, or code operable to execute the ETL tool 134, EVP 136 and error resolver 138.

The network interface 404 is configured to enable wired and/or wireless communications. The network interface 404 is configured to communicate data between the data processing system 130 and other devices, systems, or domains (e.g. source systems 110, target systems 120 and SME system 160). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each of the source systems 110, target systems 120 and SME system 160 may be implemented similar to the data processing system 130 as shown in FIG. 1. For example, each of the source systems 110, target systems 120 and SME system 160 may include a processor and a memory storing instructions to implement the respective functionality of the system when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
at least one processor configured to:
obtain an erroneous data element received from a source system before loading the erroneous data element into a production database;
generate a plurality of probable data values for the data element;
before processing the erroneous data element by an Extract, Transform and Load (ETL) logic and loading the processed data element in the production database, for each probable data value of the plurality of probable data values, verify whether the probable data value can be processed successfully by the ETL logic and by one or more target applications configured to process the data element, wherein verifying whether the probable data value can be processed successfully by the one or more target applications comprises:
    generating a temporary database, wherein the temporary database is a replica of at least a portion of the production database in which the ETL logic is to load the data element;
    loading the probable data value in the temporary database;
    performing one or more processing steps at the temporary database having the probable data value, wherein the one or more processing steps are same as corresponding one or more processing steps performed by the one or more target applications at the production database; and
    checking whether the one or more processing steps were processed successfully;
  if the one or more processing steps were processed successfully, determine the probable data value as a suggested data value of the data element, based on the verification of the probable data values; and
  output the suggested data value for processing by the ETL logic; and
a memory coupled to the at least one processor configured to store the ETL logic.

2. The apparatus of claim 1, wherein the at least one processor is configured to verify whether the probable data value can be processed successfully by checking whether the probable data value satisfies one or more pre-defined data quality definitions.

3. The apparatus of claim 2, wherein the pre-defined data quality definitions comprise data semantics definitions, definitions relating to functional dependencies relating to the data element, definitions against data redundancies and definitions against data anomalies.

4. The apparatus of claim 2, wherein the at least one processor selects as the suggested data value one of the plurality of probable data values that satisfies the one or more pre-defined data quality definitions.

5. The apparatus of claim 2, wherein the at least one processor selects as the suggested data value one of the plurality of probable data values that results in successful processing of the one or more processing steps at the temporary database.

6. A method for resolving data errors, comprising:
  obtaining an erroneous data element received from a source application before loading the erroneous data element into a production database;
  generating a plurality of probable data values for the data element;
  before processing the erroneous data element by an Extract, Transform and Load (ETL) logic and loading the processed data element in the production database, for each probable data value of the plurality of probable data values, verifying whether the probable data value can be processed successfully by the ETL logic and by one or more target applications configured to process the data element, wherein verifying whether the probable data value can be processed successfully by the one or more target applications comprises:
    generating a temporary database, wherein the temporary database is a replica of at least a portion of the production database in which the ETL logic is to load the data element;
    loading the probable data value in the temporary database;
    performing one or more processing steps at the temporary database having the probable data value, wherein the one or more processing steps are same as corresponding one or more processing steps performed by the one or more target applications at the production database; and
    checking whether the one or more processing steps were processed successfully;
  if the one or more processing steps were processed successfully, determining the probable data value as a suggested data value of the data element, based on the verification of the probable data values; and
  outputting the suggested data value for processing by the ETL logic.

7. The method of claim 6, wherein verifying whether the probable data value can be processed successfully comprises checking whether the probable data value satisfies one or more pre-defined data quality definitions.

8. The method of claim 7, wherein the pre-defined data quality definitions comprise data semantics definitions, definitions relating to functional dependencies relating to the data element, definitions against data redundancies and definitions against data anomalies.

9. The method of claim 7, wherein determining the suggested data value comprises selecting as the suggested data value one of the plurality of probable data values that satisfies the one or more pre-defined data quality definitions.

10. The method of claim 7, wherein determining the suggested data value comprises selecting as the suggested data value one of the plurality of probable data values that results in successful processing of the one or more processing steps at the temporary database.

11. A non-transitory computer-readable medium for storing instructions which when processed by one or more processors perform a method for resolving data errors, the method comprising:
  obtaining an erroneous data element received from a source application before loading the erroneous data element into a production database;
  generating a plurality of probable data values for the data element;
  before processing the erroneous data element by an Extract, Transform and Load (ETL) logic and loading the processed data element in the production database, for each probable data value of the plurality of probable data values, verifying whether the probable data value can be processed successfully by the ETL logic and by one or more target applications configured to process the data element, wherein verifying whether the probable data value can be processed successfully by the one or more target applications comprises:
    generating a temporary database, wherein the temporary database is a replica of at least a portion of the production database in which the ETL logic is to load the data element;
    loading the probable data value in the temporary database;
    performing one or more processing steps at the temporary database having the probable data value, wherein the one or more processing steps are same as corresponding one or more processing steps performed by the one or more target applications at the production database; and
    checking whether the one or more processing steps were processed successfully;
  if the one or more processing steps were processed successfully, determining the probable data value as a suggested data value of the data element, based on the verification of the probable data values; and outputting the suggested data value for processing by the ETL logic.

12. The computer-readable medium of claim 11, wherein verifying whether the probable data value can be processed successfully comprises checking whether the probable data value satisfies one or more pre-defined data quality definitions.

13. The computer-readable medium of claim 12, wherein the pre-defined data quality definitions comprise data semantics definitions, definitions relating to functional dependencies relating to the data element, definitions against data redundancies and definitions against data anomalies.

14. The computer-readable medium of claim 12, wherein determining the suggested data value comprises selecting as the suggested data value one of the plurality of probable data values that satisfies the one or more pre-defined data quality definitions.

15. The computer-readable medium of claim 12, wherein determining the suggested data value comprises selecting as the suggested data value one of the plurality of probable data values that results in successful processing of the one or more processing steps at the temporary database.

* * * * *